No. 821,865. PATENTED MAY 29, 1906.
C. DOBBS & J. R. PITMAN.
MACHINE FOR MAKING COMB POWDER.
APPLICATION FILED JUNE 28, 1905.

3 SHEETS—SHEET 1.

Witnesses: Inventors

No. 821,865. PATENTED MAY 29, 1906.
C. DOBBS & J. R. PITMAN.
MACHINE FOR MAKING COMB POWDER.
APPLICATION FILED JUNE 28, 1905.

3 SHEETS—SHEET 2.

Witnesses:

Inventors
Charles Dobbs &
John R. Pitman

No. 821,865. PATENTED MAY 29, 1906.
C. DOBBS & J. R. PITMAN.
MACHINE FOR MAKING COMB POWDER.
APPLICATION FILED JUNE 28, 1905.
3 SHEETS—SHEET 3.
Fig. 6.
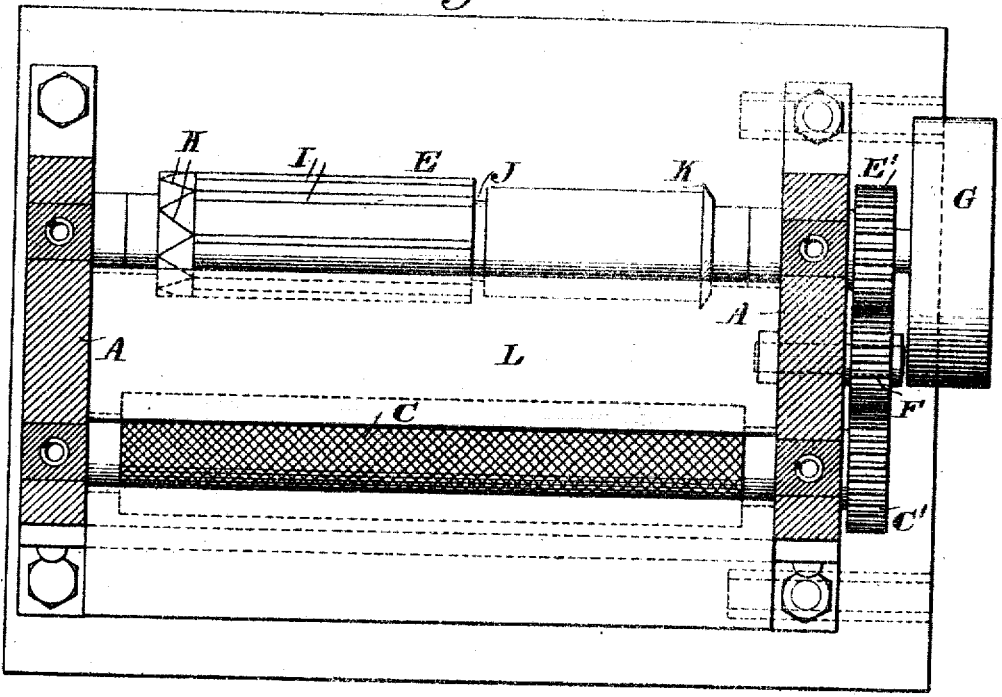
Fig. 7.
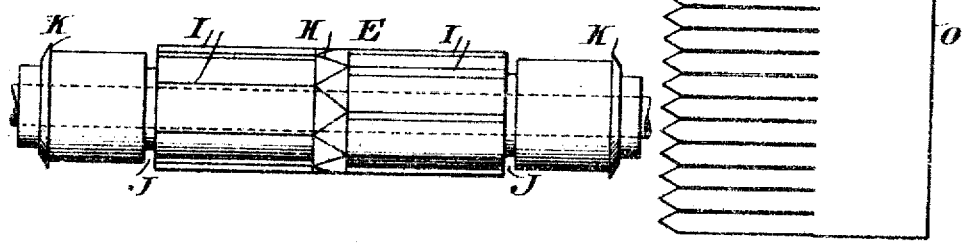
Fig. 8.
Witnesses: Inventors
Charles Dobbs
John R. Pitman

UNITED STATES PATENT OFFICE.

CHARLES DOBBS AND JOHN R. PITMAN, OF HASKELL, NEW JERSEY, ASSIGNORS TO THE E. I. DU PONT DE NEMOURS POWDER COMPANY, OF WILMINGTON, DELAWARE, A CORPORATION OF NEW JERSEY.

MACHINE FOR MAKING COMB-POWDER.

No. 821,865.          Specification of Letters Patent.          Patented May 29, 1906.

Application filed June 28, 1905. Serial No. 267,328.

*To all whom it may concern:*

Be it known that we, CHARLES DOBBS and JOHN R. PITMAN, citizens of the United States, residing at Haskell, county of Passaic, and State of New Jersey, have invented a new and useful Improvement in Machines for Making Comb-Powder, of which the following is a full, clear, and exact description, reference being had to the accompanying drawings, which form a part of this specification.

Our invention has for its object the production of a machine by the use of which comb-powder may be formed.

We will first describe the embodiment of our invention illustrated in the accompanying drawings and then point out the invention in the claims.

Figure 1:
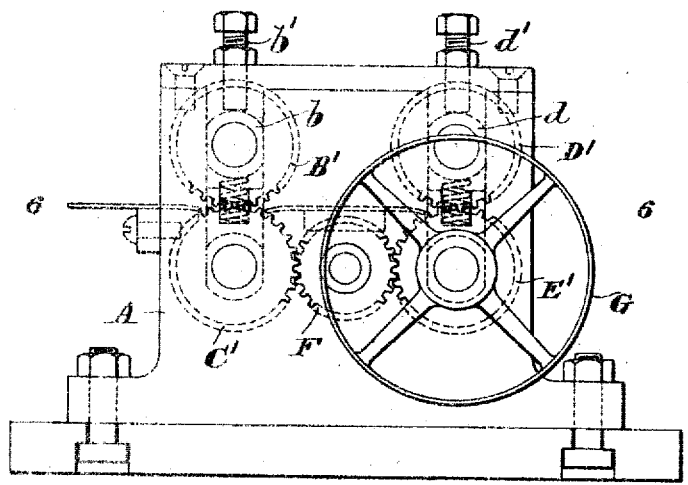
Figure 2:
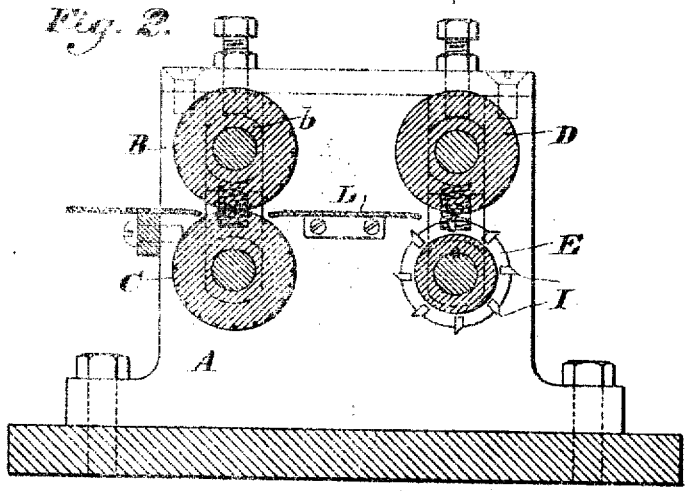
Figure 3:
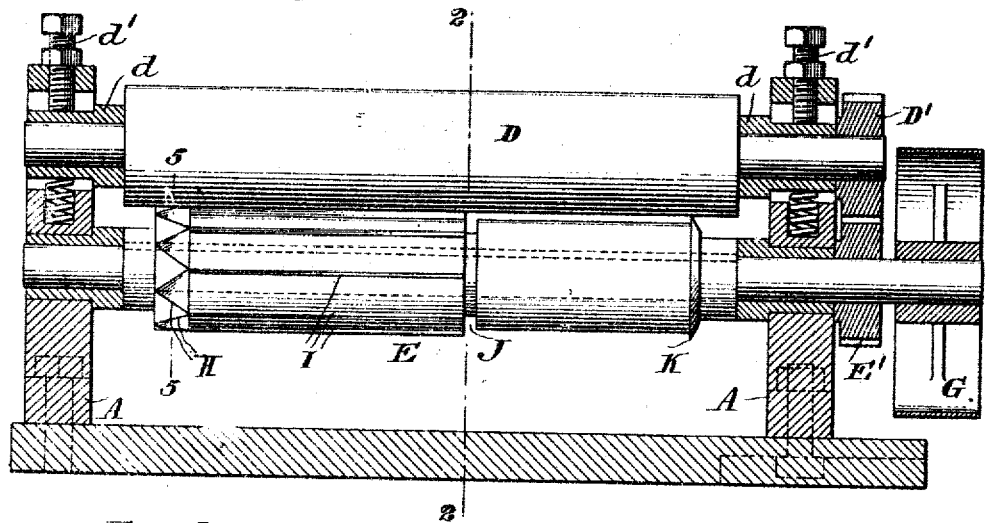
Figure 5:
Figure 4:
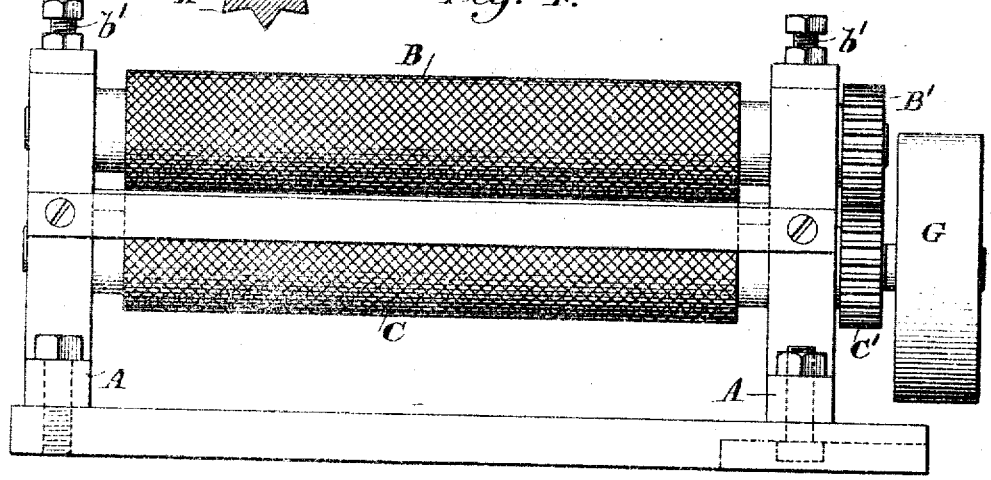

In the drawings, Figure 1 is a side elevation of the machine. Fig. 2 is a longitudinal section on the line 2 2, Fig. 3. Fig. 3 is a transverse section through the cutting-roll. Fig. 4 is an end elevation. Fig. 5 is a cross-section through a portion of the cutting-rod on the line 5 5, Fig. 3. Fig. 6 is a sectional view on the line 6 6, Fig. 1. Fig. 7 is an elevation showing a modified form of cutting-roll. Fig. 8 is a plan view of a strip of comb-powder.

In Fig. 8 is shown the form of powder strip known as "comb-powder."

A is the housing for the rolls in which the rolls B, C, D, and E are supported. The rolls B and C are the feeding-rolls, while the rolls D and E are the formative rolls. The rolls B and D, the upper rolls, are supported upon spring-bearings $b$ and $d$, respectively, controlled by the screws $b'$ and $d'$, respectively, whereby the tension of the respective upper rolls upon their corresponding lower rolls may be regulated.

Each roll carries a gear, the roll B having a gear B', which meshes with a gear C', carried by the lower roll. In like manner the roll D has a gear D' meshing with the gear E' of the roll E. The gears E' and C' mesh with the intermediate gear F. Upon the shaft of the gear E' is the pulley G, driven by a belt (not shown) from a source of power, also not shown. The surfaces of the rolls B and C are roughened, so as to feed the strip of powder inserted between them. The roll D is a plain-faced roll. The roll E at one end has the angular knives or cutting edges H. (Shown in section, Fig. 5.) The periphery of this roll for a certain distance, the length to which the comb is desired when formed, is provided with equispaced projecting longitudinal cutting edges or knives I, they being the distance apart desired between the comb projections. At the end of this last-mentioned portion of the roll E a pocket or cut-away portion J is formed in the roll. Beyond this pocket the roll is of less diameter than the portion containing the knives or cutting edges I. At the other end of this portion of less diameter is secured the circular knife or cutting edge K, which projects so as to be in the same plane with the knives I. In practice the block or plate of powder is entered between the rolls B and C and by them fed over the table or intermediate support L to, between, and through the rolls D and E. In passing between the rolls D and E the knives or cutting edges H form the angular ends, Fig. 8, of the comb, the longitudinal knives I cut the slits N, and the circular cutting edge K forms the end O. By operating the screw $b'$ the desired pressure for feeding may be obtained, and by regulating the screw $d'$ the desired pressure of roll D upon roll E to produce the proper cutting is obtained.

We can instead of forming a single strip of comb simultaneously form a plurality of such strips by using the roll E, as shown in Fig. 7, in which is practically two rolls, each like the roll E heretofore described, with the cutting edges or knives H placed centrally of the roll and the corresponding parts extending from each side thereof to the ends of the rolls. The pocket or cut-away portion J is of great value, as it allows for clearance of the cut powder.

We do not intend to limit ourselves to the use of such a roll as E in conjunction with a roll as D, as we consider such roll broadly new, and the same may be used other than with the roll as D—such, for instance, in the manner described and illustrated in an application filed by us contemporaneously with this application, which application bears filing date of June 28, 1905, and is serially numbered 267,329.

Having now fully described our invention, what we claim, and desire to protect by Letters Patent, is—

1. In a machine for forming comb-powder, a roll having one end formed of sets of converging angular cutting edges and straight cutting edges, extending from the divergent ends of each set of angular cutting edges, there being a cut-away portion of the roll at the opposite end of said straight cutting edges.

2. In a machine for forming comb-powder, a roll having one end formed of sets of converging angular cutting edges and straight cutting edges, extending from the divergent ends of each set of angular cutting edges, there being a cut-away portion of the roll at the opposite end of said straight cutting edges, and a plain surface beyond said straight cutting edges of less diameter than the cutting edges.

3. In a machine for forming comb-powder, a roll provided with angular cutting edges at one end thereof and longitudinal cutting edges extending therefrom, and a plain surface beyond said cutting edges of less diameter than the cutting edges, and a cutting edge at the end of said last-mentioned surface of diameter equal to the last-mentioned cutting edges.

4. In a machine for forming comb-powder, a roll provided with angular cutting edges at one end thereof, and longitudinal cutting edges extending therefrom, there being a cut-away portion of the roll at the opposite end of said longitudinal cutting edges, and a plain surface beyond said cutting edges of less diameter than the cutting edges, and a cutting edge at the end of said last-mentioned surface of diameter equal to the last-mentioned cutting edges.

5. In a machine for forming comb-powder, a roll having one end formed of sets of converging angular cutting edges and straight cutting edges, extending from the divergent ends of each set of angular cutting edges, there being a cut-away portion of the roll at the opposite end of said straight cutting edges, and a plain-surfaced roll resting upon said first-mentioned roll.

6. In a machine for forming comb-powder, a roll having one end formed of sets of converging angular cutting edges and straight cutting edges, extending from the divergent ends of each set of angular cutting edges, there being a cut-away portion of the roll at the opposite end of said straight cutting edges, a plain-surfaced roll resting upon said first-mentioned roll, and means to vary the pressure of the rolls.

7. In a machine for forming comb-powder, a roll having one end formed of sets of converging angular cutting edges and straight cutting edges, extending from the divergent ends of each set of angular cutting edges, there being a cut-away portion of the roll at the opposite end of said straight cutting edges, and a plain surface beyond said straight cutting edges of less diameter than the cutting edges, and a plain-surfaced roll resting upon said first-mentioned roll.

8. In a machine for forming comb-powder, a roll having one end formed of sets of converging angular cutting edges and straight cutting edges, extending from the divergent ends of each set of angular cutting edges, there being a cut-away portion of the roll at the opposite end of said straight cutting edges, a plain surface beyond said straight cutting edges of less diameter than the cutting edges, a plain-surfaced roll resting upon said first-mentioned roll, and means to vary the pressure of the rolls.

9. In a machine for forming comb-powder in combination, a roll provided with angular cutting edges at one end thereof and longitudinal cutting edges extending therefrom and a plain surface beyond said cutting edges of less diameter than the cutting edges and a cutting edge at the end of said last-mentioned surface of diameter equal to the last-mentioned cutting edges and a plain surfaced roll resting upon said first-mentioned roll.

10. In a machine for forming comb-powder, in combination, a roll provided with angular cutting edges at one end thereof and longitudinal cutting edges extending therefrom and a plain surface beyond said cutting edges of less diameter than the cutting edges and a cutting edge at the end of said last-mentioned surface of diameter equal to the last-mentioned cutting edges and a plain-surfaced roll resting upon said first-mentioned roll, and means to vary the pressure of the rolls.

11. In a machine for forming comb-powder, in combination, a roll provided with angular cutting edges at one end thereof and longitudinal cutting edges extending therefrom, there being a cut-away portion of the roll at the opposite end of said longitudinal cutting edges, and a plain surface beyond said cutting edges of less diameter than the cutting edges, and a cutting edge at the end of said last-mentioned surface of diameter equal to the last-mentioned cutting edges, and a plain-surfaced roll resting upon said first-mentioned roll.

12. In a machine for forming comb-powder, in combination, a roll provided with angular cutting edges at one end thereof and longitudinal cutting edges extending therefrom, there being a cut-away portion of the roll at the opposite end of said longitudinal cutting edges, and a plain surface beyond said cutting edges of less diameter than the cutting edges, and a cutting edge at the end of said last-mentioned surface of diameter equal to the last-mentioned cutting edge, and a plain-surfaced roll resting upon said first-mentioned roll, and means to vary the pressure of the rolls.

13. A cutting device for forming combpowder, comprising sets of angular cutting edges forming one end of said device and straight cutting edges extending from the divergent ends of each set of angular cutting edges, and a cut-away portion or pocket at the opposite end of said straight cutting edges.

14. A cutting device for forming combpowder comprising angular cutting edges at one end and longitudinal cutting edges extending therefrom, and a cut-away portion or pocket at the opposite end of said longitudinal cutting edges, and a plain surface beyond said cutting edges and at a lower plane than said cutting edges.

15. A cutting device for forming combpowder comprising angular cutting edges at one end and longitudinal cutting edges extending therefrom and a plain surface beyond said cutting edges and at a lower plane than said cutting edges, and a cutting edge at the end of said last-mentioned surface in the same plane as the last-mentioned cutting edges.

16. A cutting device for forming combpowder, comprising angular cutting edges at one end and longitudinal cutting edges extending therefrom, and a cut-away portion or pocket at the opposite end of said longitudinal cutting edge a plain surface beyond said cutting edges and at a lower plane than said cutting edges, and a cutting edge at the end of said last-mentioned surface in the same plane as the last-mentioned cutting edges.

In testimony of which invention we have hereunto set our hands, at Haskell, New Jersey, on this 21st day of June, 1905.

CHARLES DOBBS.
JOHN R. PITMAN.

Witnesses:
GEO. W. COLFAX,
J. W. ACKERMAN, Jr.